United States Patent [19]

Legér

[11] Patent Number: 4,547,634

[45] Date of Patent: Oct. 15, 1985

[54] ELECTRICAL APPLIANCE INTERLOCK SWITCH WITH IMPROVED BUSS

[75] Inventor: Raymond A. Legér, Crystal Lake, Ill.

[73] Assignee: Cherry Electrical Products Corporation, Waukegan, Ill.

[21] Appl. No.: 512,931

[22] Filed: Jul. 12, 1983

[51] Int. Cl.[4] .................................... H02B 1/08

[52] U.S. Cl. .................... 200/50 C; 200/1 A; 200/283; 219/10.55 C; 361/344

[58] Field of Search ............ 126/197; 219/10.55 C; 361/335, 341, 343, 344, 425, 407, 355, 361, 367, 425; 200/1 A, 5 R, 5 A, 5 B, 5 C, 18, 50 A, 50 C, 61.62, 61.7, 61.81, 246, 247, 283, 321, 322

[56] References Cited

U.S. PATENT DOCUMENTS 4,160,885 7/1979 Ellicott .................... 200/1 R
4,220,382 9/1980 Ritchie .................... 361/407
4,303,962 12/1981 Wolber .................... 361/407
4,351,995 9/1982 Inoue .................... 200/159 A

FOREIGN PATENT DOCUMENTS 0015542 2/1979 Japan .................... 219/10.55 C

*Primary Examiner*—G. P. Tolin
*Attorney, Agent, or Firm*—Willian Brinks Olds Hofer Gilson & Lione Ltd.

[57] ABSTRACT

In an interlock switch used with an electrical appliance such as a microwave oven. The interlock switch has a housing having an interior front wall, and a plurality of conductive switch elements. A pair of barriers define a pair of gaps with the interior front wall for mounting a buss, comprising a first segment, formed integrally with one of the conductive switch elements, and a second segment, formed integrally with another one of the conductive switch elements.

6 Claims, 6 Drawing Figures

ELECTRICAL APPLIANCE INTERLOCK SWITCH WITH IMPROVED BUSS

BACKGROUND OF THE INVENTION

This invention relates generally to electrical appliances and specifically to microwave ovens which have a frame defining a cooking chamber, and a door hingedly mounted to the frame. More particularly, this invention relates to such appliances which utilize an interlock switch, mounted in the door jamb, actuated by probe means extending from the door in alignment with the door jamb. The interlock switch permits the oven to be operated only when the oven door is fully closed and latched, thereby providing a highly desirable safety feature.

Interlock switches used for this purpose typically comprise two electrically coupled switches, both of which must be actuated in order for operating power to be passed to the oven. The value of such an interlock switch is, of course, reduced if one of the two electrically coupled switches becomes welded closed due to tampering, equipment malfunction or some spurious condition. If this occurs, actuation of the unaffected switch will be the only action necessary to allow operating power to be passed to the oven. This, of course, would defeat many of the safety benefits associated with a conventional interlock switch.

SUMMARY OF THE INVENTION

The subject invention is characterized by an interlock switch comprising a housing having an inside front wall and three groups of conductive switch elements, most of which are mounted along that wall in cantilever arrangement. Mounted inside the housing is a stationary barrier located between a first group and a second group of conductive switch elements and a movable barrier located between the second group and the third group of conductive elements. The stationary barrier has a portion displaced from the front wall defining a first gap therewith, and the movable barrier has a portion displaced from the front wall defining a second gap therewith disposed within the first gap and the second gap interconnects one of the conductive switch elements in the first group with one of the conductive switch elements in the third group. Because the buss is substantially captivated within the gaps defined by the front wall and the stationary and movable barriers, the likelihood of it interfering with the operation of the switch elements even if it becomes broken off is greatly minimized.

BRIEF DESCRIPTION OF THE DRAWINGS

The preferred embodiment of the invention summarized above is shown in the accompanying drawings wherein.

DETAILED DESCRIPTION OF THE PREFERRED EMBODIMENT OF THE INVENTION

Figure 1:
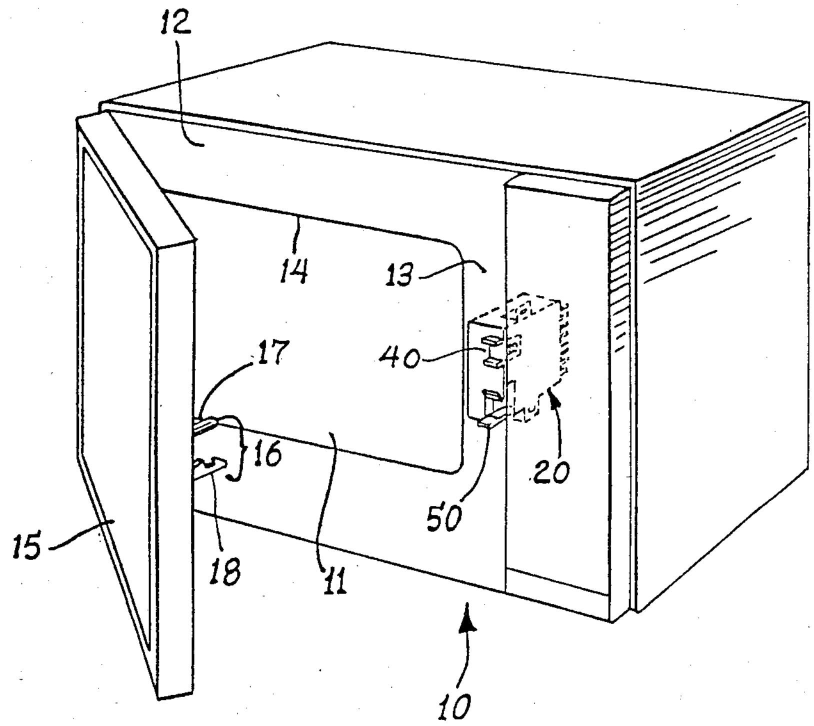
FIG. 1 is a schematic, perspective view of an electrical appliance incorporating the invention.

Referring now to FIG. 1 there is illustrated a preferred embodiment of the invention. In particular, there is illustrated an electrical appliance, such as a microwave oven 10, having a frame 12 defining a chamber 11 into which food to be heated by oven 10 is placed. Frame 12 further includes a door jamb 13 into which is mounted an interlock switch 20.

Oven 10 further includes an oven door 15 which is typically hingebly mounted to frame 12. Near the free end of oven door 15 there is mounted probe means 16, preferably in the form of a rigid pin member 17 and a movable latch pawl 18. Pin member 17 and latch pawl 18 are preferably aligned with door jamb 13, and in particular are aligned, respectively, with a first actuator 40 and a second actuator 50 associated with interlock switch 20. As explained in greater detail hereinafter, pin member 17 operates first actuator 40 as oven door 15 becomes partially closed, and latch pawl 18 operates second actuator 50, when oven door 15 is fully closed and latched.

Figure 5:
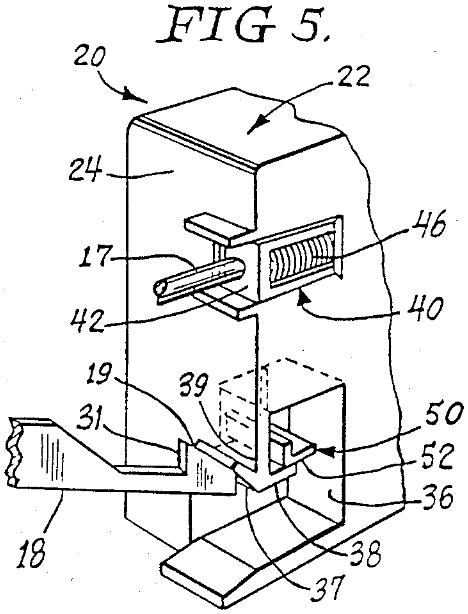
FIG. 5 is an enlarged, schematic, perspective of a portion of the appliance and the interlock switch shown in FIG. 1.
Figure 6:
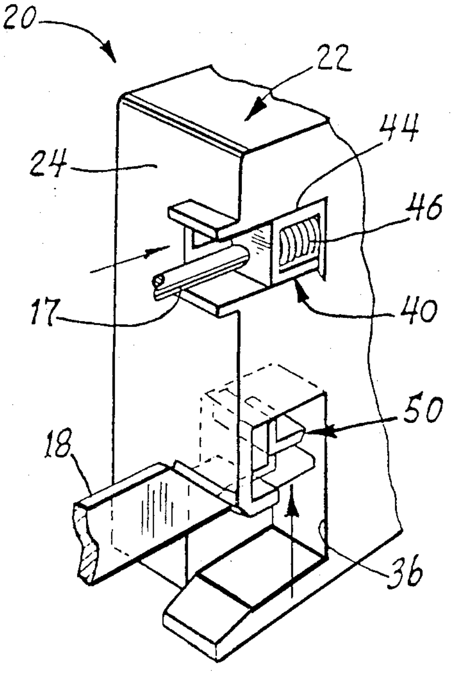
FIG. 6 is an enlarged, schematic, perspective view of the portion of the interlock switch shown in FIG. 5, but in an actuated condition.

The operation of probe means 16 in the form of pin member 17 and latch pawl 18 are shown best by referring to FIGS. 5 and 6. As oven door 15 closes, rigid pin member 17 abuts a contact face 42 of first actuator 40, thereby moving a slider 44 horizontally (see horizontal arrow in FIG. 6) against a coil spring 46. The movement of slider 44 causes actuation of several switch elements associated with interlock switch 20 in a manner explained in greater detail hereinafter.

Similarly, latch pawl 18 operates second actuator 50 when oven door 15 is fully closed and latched. Thus, still referring to FIGS. 5 and 6, interlock switch 20 comprises a housing 22 having a rear wall 24. Rear wall 24 defines a notch 36 and a latch 39 extending therein. Latch 39 has an angled face 37 and a horizontal face 38 adapted to be sequentially contacted by a latch surface 19 of latch pawl 18. When latch pawl 18 begins to advance into notch 36 in side wall 24, during the closure of oven door 15, latch surface 19 is urged downwardly by angled face 37 of latch 39. As latch pawl 18 advances further into notch 36, latch surface 19 slides along horizontal face 38 of latch 39 until face 38 is aligned with a cutout 31 defined in latch pawl 18. When this occurs, latch pawl 18 springs upwardly (see vertical arrow in FIG. 6), whereby oven door 15 is fully closed and latch pawl 18 becomes latched with latch 39.

As shown in FIGS. 5 and 6, in this preferred embodiment, probes 16,17 operate actuators 40,50 without actually entering the interior of housing 22 of interlock switch 20. Indeed, throughout the entire operation of switch 20, actuators 40,50 isolate the outside environment of switch 20 from the interior of housing 22. As a result, door probe wear particles and other spurious material cannot readily enter housing 22 and perhaps interfere with the operation of the various components therein. Further, this arrangement greatly minimizes the likelihood that access to the interior of housing 22 can be gained via an external implement (such as a knife or screwdriver) through tampering, carelessness or accident.

Operation of actuator 50 by the latching of latch pawl 18 to latch 39 causes actuator 50 to move from the position shown in FIG. 5, to the position shown in FIG. 6. This, in turn, causes actuation of several switch elements associated with interlock switch 20 in a manner explained in greater detail hereinafter. From the foregoing description, however, it should be clear that the sequence of movement of actuators 40 and 50 is such that first actuator 40 is operated by rigid pin member 17 before oven door 15 is fully closed, but second actuator 50 is not operated by latch pawl 18 until oven door 15 is fully closed and latched.

Figure 2:
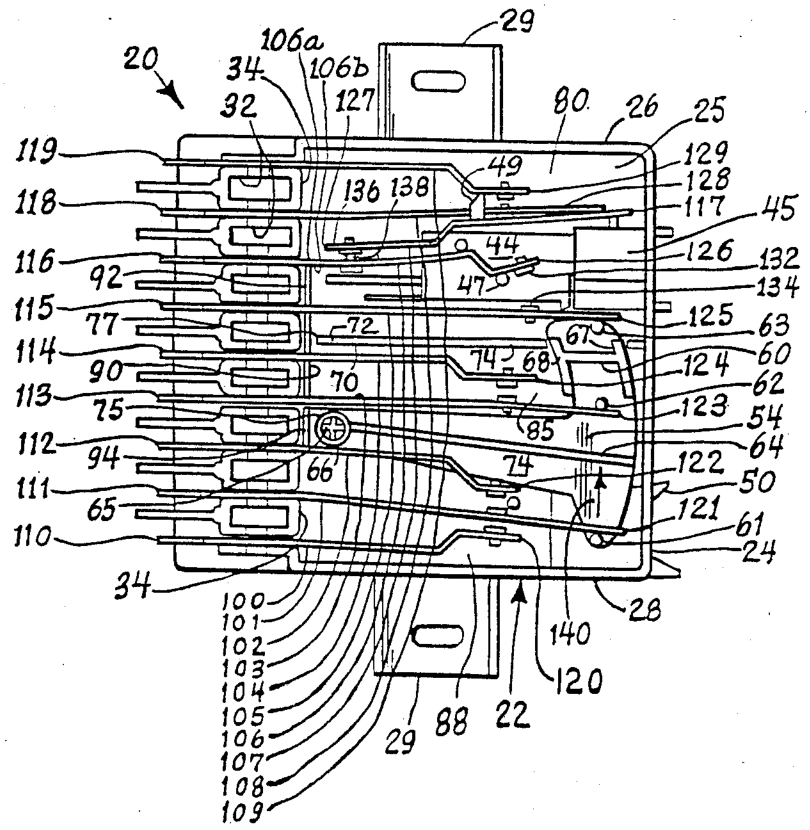
FIG. 2 is a schematic, plan view of the interlock switch used with the appliance shown in FIG. 1.
Figure 3:
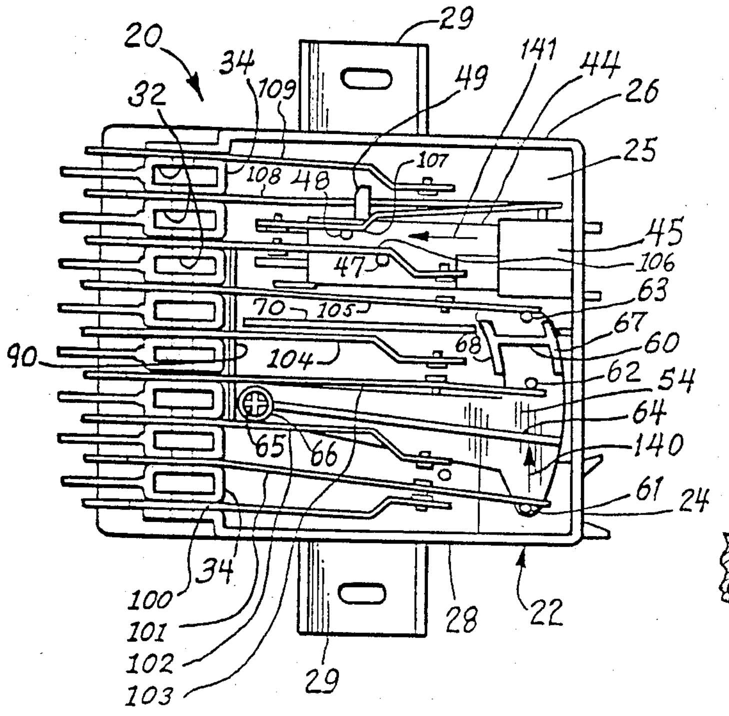
FIG. 3 is a schematic, plan view of the interlock switch shown in FIG. 2 in a partially actuated condition.
Figure 4:
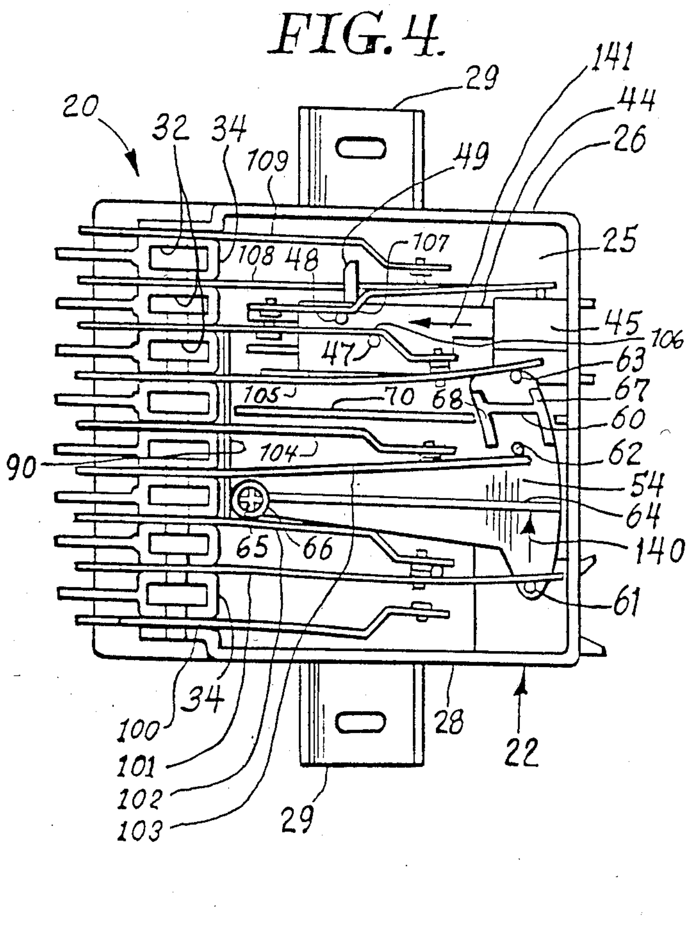
FIG. 4 is a schematic, plan view of the interlock switch shown in FIG. 2 in a fully actuated condition.

The specific components of interlock switch 20 and their operational sequence in response to the movement of actuators 40 and 50 is illustrated in FIGS. 2–4. In particular, FIG. 2 illustrates the position of the switch elements comprising interlock switch 20 when oven door 15 is open, FIG. 3 illustrates the position of those switch elements when oven door 15 is partially closed, and FIG. 4 illustrates the position of those switch elements when oven door 15 is fully closed and latched.

Referring now to FIG. 2, housing 22 of interlock switch 20 is shown to include, in addition to rear wall 24, a pair of side walls 26, 28 a bottom wall 25, and a plurality of anchoring fixtures 32 defining an interior front wall 34. Extending outwardly from side walls 26, 28 are a pair of mounting ears 29 which are used to facilitate the mounting of interlock switch 20 in door jamb 13 of oven 10.

Interlock switch 20 further includes a stationary barrier 70 which preferably comprises a rigid member extending upwardly from base 25 near the center of housing 22. Pivotally mounted to base 25 of housing 22 is a platform 54 having a movable barrier 60 extending upwardly therefrom along substantially the same line defined by stationary barrier 70 when oven door 15 is in the fully closed position of FIG. 4. A pair of substantially parallel flange members 67, 68 also extend upwardly from platform 54 intersecting, respectively, the opposite ends of movable barrier 60. Also extending upwardly from platform 54 are three rigid pins 61, 62 and 63 whose function will be explained hereinafter.

An additional moveable barrier 64, extending substantially parallel to stationary barrier 70 when oven door 15 is in the fully closed position of FIG. 4 also extends upwardly from platform 54. Additional barrier 64 terminates in a hub 66 which is mounted over a post 65 extending upwardly from base 25. Actuator 50 is preferably integrally formed with platform 54 near the end thereof opposite hub 66. Thus, movement of actuator 50, in response to movement of latch pawl 18, causes platform 54 to pivot about post 65. This movement of platform 54 causes a corresponding movement of pins 61, 62 and 63, movable barrier 60, and additional barrier 64.

Housing 22 further incorporates a slider guide 45 through which slider 44 can be moved back and forth in response to the operation of actuator 40 by rigid pin member 17. Extending upwardly from slider 44 is a pair of actuator pins 47, 48, and extending transversely from slider 44 is an actuator arm 49. The functions of actuator pins 47, 48 and actuator arm 49 will be explained hereinafter.

Mounted inside housing 22 of interlock switch 20 are a plurality of electrically conductive switch elements 100–109. Switch elements 100-106 and switch elements 108–109 have, respectively, fixed ends 110–116 and 118–119, substantially captivated between adjacent ones of anchoring fixtures 32, and (except for switch element 108) free ends 120–126 and 128–129.

Interlock switch 22 also includes an electrically conductive switch element 107 which is preferably integrally formed with switch element 108. Thus, in this embodiment, switch element 107 has a free end 127 and an interconnected end 117 which connects with an interconnected end 128 of switch element 108. Each of switch elements 100–109 is preferably mounted edgewise within housing 22 of interlock switch 20, so that they sometimes function as leaf springs, and are formed of electrically conductive material such as copper or the like.

In this preferred embodiment switch elements 100 and 101 form part of a circuit for an auxiliary device such as a lamp (not shown), and are normally closed, i.e., in the "make" condition, when oven door 15 is in the open position of FIG. 2. Thus, the lamp in the circuit comprising switch elements 100 and 101 will be illuminated when oven door 15 is open.

Switch elements 101 and 102 preferably form part of a primary interlock circuit for microwave oven 10, and are normally open, i.e., in the "break" condition when oven door 15 is in the open position of FIG. 2. Thus, switch elements 101 and 102 prevent operating power from being supplied to microwave oven 10 as long as oven door 15 is open, converting to the "make" condition only when the door is fully closed and latched.

Switch elements 103 and 104 preferably form part of a logic circuit (not shown) which, in accordance with well known microwave oven operation, controls many of the oven's operating parameters and sequences. As shown in FIG. 2, switch elements 103 and 104 are normally in the "break" condition when oven door 15 is open, thereby rendering the logic circuitry inoperative at that time.

Switch elements 105 and 106 comprise the secondary interlock for microwave oven 10. As with the primary interlock defined by switch elements 101 and 102, switch elements 105 and 106 are normally in the "break" condition when oven door 15 is open, changing to the "make" condition only when oven door 15 is fully closed and latched.

Switch elements 106 and 107 form part of a monitoring circuit which includes a fuse (not shown), and are normally in the "make" condition when the oven door is open. In accordance with conventional interlock switch operation, if switch elements 106 and 107, and switch elements 105 and 106, are ever simultaneously closed, such as if a malfunction causes switch elements 105 and 106 to be welded together, the fuse will blow, thereby preventing operating power from being supplied to oven 10 even if all other conditions for proper oven operation have been satisfied. Switch element 106, sometimes referred to herein as a common switch element, has a monitor side **106*a* and an interlock side 106*b*. A part 138 of switch element 106 on the monitor side 106*a* is adapted to contact a portion 136 of switch element 107 near the free end 127 thereof when oven door 15 is open. On the other hand, a part 132 on the interlock side 106*b* of switch element 106 is adapted to contact a portion 134 of switch element 105 when oven door 15** is fully closed and latched.

Finally, switch elements 108 and 109, which are normally in the "break" condition when oven door 15 is open, form part of a second auxillary circuit which may also include a lamp (not shown). In this preferred embodiment switch elements 108 and 109 are disposed lower in housing 22 than any of the other switch elements 100 through 107. In particular, switch elements 108 and 109 are located in a plane slightly above base 25 of housing 22, while switch elements 100 through 107 are located in a plane closer to the top of housing 22.

A buss 90, preferably comprised of an integrally formed segment 94 of switch element 102 and an integrally formed segment 92 of switch element 106 serves to electrically interconnect those two switch elements. For safety purposes, buss 90 is mounted edgewise in gaps 75 and 77, thereby being substantially captivated between interior front wall 34 on the one hand, and the forward end 72 of stationary barrier 70 and the forward end of movable barrier 64, i.e., hub 66 on the other hand. The segments 92, 94 comprising buss 90 are preferably formed by bending portions of switch elements 102 and 106 until the ends of the bent portions are in facing relationship. These ends of segments 92, 94 are then electrically interconnected in any conventional manner.

Stationary barrier 70 and movable barrier 60, along with portions of rear wall 24, side wall 26 and interior front wall 34, define a first compartment 80 within housing 22 of interlock switch 20. First compartment 80 serves to confine, within that compartment, any pieces of interlock switch 20 which, due to part failure, abuse, or manufacturing error, become broken off and loose inside housing 22. By isolating such broken off pieces in this manner, they cannot accidentally fall into a portion of housing 22 outside the boundaries of first compartment 80 and accidentally short circuit or interfere with other switch elements or components. For the same purpose, stationary barrier 70, movable barrier 60 and additional barrier 64, along with portions of rear wall 24 and interior front wall 34 define a second compartment 85, isolated from other portions of housing 22. Similarly, additional barrier 64, along with portions of rear wall 24, side wall 28 and interior front wall 34 define a third compartment 88, isolated from other portions of housing 22.

The operation of interlock switch 20 can now be explained. When oven door 15 is open, the switch elements of interlock switch 20 take the configuration shown in FIG. 2. In this configuration, pin 61 provides a force on switch element 101 substantially in the direction of arrow 140. Similarly, pin 63 provides a force on switch element 105 substantially in the same direction as arrow 140. On the other hand, pin 62 provides a force on switch element 103 in the direction opposite arrow 140. Thus, when actuator 50 is operated by latch pawl 18 (FIG. 6) the force opposing the movement of actuator 50 is substantially reduced. In particular, if the magnitude of the force at each of pins 61, 62 and 63 is substantially equal, the combined force of pins 61, 62 and 63 opposing movement of actuator 50 is approximately one third that which it would be if the forces applied by all three pins 61, 62 and 63 were in the same direction as arrow 140.

As oven door 15 begins to close, the operation of rigid pin member 17 and actuator 40 takes effect. This, in turn, causes slider 44, and hence actuator pins 47, 48 and actuator arm 49, to move from the positions shown in FIG. 2 to the position shown in FIG. 3. Thus, switch elements 108 and 109 move from the "break" to the "make" position, while switch elements 107 and 106 move from the "make" to the "break" position. Further, switch element 106 moves closer to (but still does not contact) switch element 105.

When oven door 15 is fully closed, and latch pawl 18 is latched to latch 39 (FIG. 6), the switch elements change from the positions shown in FIG. 3 to the positions shown in FIG. 4. More particularly, switch elements 105 and 106 contact one another. Switch elements 103 and 104 move from the "break" to the "make" position, switch elements 101 and 102 move from the "break" to the "make" position, and switch elements 100 and 101 move from the "make" to the "break" position.

The interlock switch described herein, when used in connection with an electrical appliance such as microwave oven 10, provides many efficiencies, economies, and safety features. For example, the use of switch element 106 as a cantilevered common switch element adapted to contact switch element 107 on one side of switch element 106 and to contact switch element 105 on the other side of switch element 106, combines the advantages of reliability, efficiency, economy, and compactness in a single switch. Further, the use of stationary and movable barriers of the type described isolates any pieces of interlock switch 20 which, due to part failure, abuse, or manufacturing error, become broken off or loose inside housing 22. As such, these broken off pieces cannot accidentally fall into portions of housing 22 outside the boundaries of the compartments in which they are confined, and accidentally short circuit or interfere with other switch elements or components. Additionally, by captivating buss 90 in gaps 75 and 77, and forming it integrally from portions of switch elements 102 and 106, the chances of buss 90 breaking away and causing electrical or mechanical damage to the other components of interlock switch 20 is greatly reduced.

In view of the foregoing, the above described interlock switch, adapted for use with an electrical appliance such as a microwave oven, has numerous benefits and advantages not available heretofore. However, several modifications and embodiments of this switch, and its operating environment, which do not part from the true scope of the invention, will become apparent to those skilled in the art. Accordingly, all such modifications and embodiments are intended to be covered by the appended claims.

We claim:

1. An interlock switch, comprising:

a housing having an interior front wall;

first conductive switch means mounted in said housing along said wall;

second conductive switch means mounted in said housing adjacent to said first switch means and along said wall;

third conductive switch means mounted in said housing adjacent to said second switch means and along said wall, so that said second switch means is disposed between said first and third switch means;

a first insulating barrier mounted in said housing between said first and said second conductive switch means, said first insulating barrier having a forward portion displaced from said front wall and defining a first gap therewith;

a second insulating barrier mounted in said housing between said second and said third conductive switch means, said second insulating barrier having a forward portion displaced from said front wall, and defining a second gap therewith; and an electrically conducting buss, disposed within said first gap and said second gap, and electrically interconnecting said first conductive switch means and said third conductive switch means across said second conductive switch means without contacting said second conductive switch means.

2. The interlock switch defined in claim 1 wherein said buss is disposed edgewise within said first and second gaps and is captivated therein.

3. The interlock switch defined in claim 1 wherein said first conductive switch means includes at least one conductive switching blade and said second conductive switch means includes at least one other conductive switching blade, said buss including an intermediate conducting portion conductively connected to said blades at its ends.

4. The interlock switch defined in claim 3, wherein said buss is integrally formed with said blades.

5. An interlock switch, comprising:

a housing having a front wall;

a plurality of conductive switch elements mounted in said housing for making and breaking electrical switching connections, said plurality including one or more first contactor elements, one or more second contactor elements located adjacent to said first contactor elements, and one or more intermediate contactor elements located between said first and second contactor elements;

barrier means including first and second insulating barrier walls disposed in said housing and forming a plurality of compartments which isolate said first from said second contactor elements, and said intermediate contactor elements from said first and said barrier walls having ends disposed in spaced relation to said front wall and an electrically conducting buss disposed in upstanding relation within the space defined between the ends of said barrier walls and said front wall and electrically interconnecting at least one of said first contactor elements and at least one of said second contactor elements across said barrier walls and across said intermediate contactor elements without conductively contacting any of said intermediate contactor elements and without interfering with the isolation of said compartments.

6. The interlock switch defined in claim 5 wherein said buss comprises a first segment integrally formed from at least one of said first contactor elements, and a second segment integrally formed from at least one of said second contactor elements.

* * * * *